United States Patent
Mayer et al.

(10) Patent No.: US 10,009,357 B2
(45) Date of Patent: Jun. 26, 2018

(54) DATA FRAME FOR PROTECTED DATA TRANSMISSIONS

(71) Applicant: Infineon Technologies AG, Neubiberg (DE)

(72) Inventors: Albrecht Mayer, Deisenhofen (DE); Gerd Dirscherl, Munich (DE); Wieland Fischer, Munich (DE)

(73) Assignee: Infineon Technologies AG, Neubiberg (DE)

( * ) Notice: Subject to any disclaimer, the term of this patent is extended or adjusted under 35 U.S.C. 154(b) by 125 days.

(21) Appl. No.: 14/728,323

(22) Filed: Jun. 2, 2015

(65) Prior Publication Data

US 2015/0350241 A1    Dec. 3, 2015

(30) Foreign Application Priority Data

Jun. 2, 2014    (DE) .................. 10 2014 007 820

(51) Int. Cl.
*H04L 29/06*    (2006.01)
*H04L 29/08*    (2006.01)
*H04L 12/40*    (2006.01)
*H04L 9/32*    (2006.01)

(52) U.S. Cl.
CPC ............ *H04L 63/12* (2013.01); *H04L 9/3226* (2013.01); *H04L 12/40* (2013.01); *H04L 63/04* (2013.01); *H04L 63/123* (2013.01); *H04L 63/126* (2013.01); *H04L 63/1441* (2013.01);
(Continued)

(58) Field of Classification Search
CPC ..... H04L 63/1441; H04L 12/40; H04L 63/04; H04L 63/123; H04L 63/126; H04L 63/12; H04L 9/3226; H04L 2012/40273; H04L 2209/34; H04L 67/10
See application file for complete search history.

(56) References Cited

U.S. PATENT DOCUMENTS

| 7,243,289 B1* | 7/2007 | Madhusudhana ... | H03M 13/091 |
| | | | 714/758 |
| 2004/0019783 A1* | 1/2004 | Hawkes ................ | H04L 9/0637 |
| | | | 713/161 |
| 2013/0077641 A1 | 3/2013 | Burger, Jr. | |

FOREIGN PATENT DOCUMENTS

| DE | 102010042539 A1 | 4/2012 |
| WO | 2013128317 A1 | 9/2013 |

OTHER PUBLICATIONS

Pang et al., "Secure Transmission Mechanism for Networked Control Systems under Deception Attacks", IEEE, Mar. 2011, pp. 27-32 http://ieeexplore.ieee.org/stamp/stamp.jsp?tp=&arnumber=6011758.*

(Continued)

*Primary Examiner* — Jung W Kim
*Assistant Examiner* — Carlos M De Jesus Lassala
(74) *Attorney, Agent, or Firm* — Eschweiler & Potashnik, LLC (57) ABSTRACT

A method for generating a data frame is disclosed which contains a user data block with the message and a code block. To generate the code block, a first data record is initially coded by means of a first coding algorithm in order to calculate a first code word. Subsequently, the message is transformed. By using the first code words thus generated and the transformed message, a second code word is subsequently calculated by using a second coding algorithm. The data frame comprises the second code word but not the first code word.

16 Claims, 11 Drawing Sheets

(52) U.S. Cl.
CPC .... *H04L 67/10* (2013.01); *H04L 2012/40273* (2013.01); *H04L 2209/34* (2013.01)

(56) References Cited

OTHER PUBLICATIONS

Song, "The AES-CMAC algorithm", RFC 4493, Jun. 2006, pp. 1-20, https://tools.ietf.org/html/rfc4493.*

* cited by examiner

DATA FRAME FOR PROTECTED DATA TRANSMISSIONS

CROSS REFERENCE TO RELATED APPLICATIONS

This application claims priority to German Application number 10 2014 007 820.5, filed on Jun. 2, 2014.

FIELD

The invention relates to a method for generating a data frame, a transmitter for transmitting the generated data frame, a bus system comprising a transmitter and a receiver and a microprocessor, especially for applications in a motor vehicle.

BACKGROUND

The safe transmission of data is of great significance particularly in motor vehicles because control of safety-related systems such as airbags or automatic braking systems must operate safely.

As a rule, the data to be transmitted in modern motor vehicles are present in digital form and their transmission is controlled and monitored by microcontrollers. The digital data are usually transported via bus systems from a transmitter to one or more receivers which interconnect the various systems with one another in the car. For example, the CAN (Controller Area Network) bus or the TTCAN (Time Triggered CAN) bus, respectively, the LIN (Local Interconnect Network) bus, Ethernet or the FlexRay bus are used.

Apart from the operational reliability which has the aim, e.g. that the data to be transmitted by a transmitter are not changed by unintentional disturbances, e.g. short circuits on the transmission line, and are therefore not received faultlessly at the receiver, protection against malicious attacks must also be ensured.

One example of a malicious attack by a hacker in the case of a car could be to interfere with the internal bus system of the vehicle and to falsify the transmitted data. An attack could also consist not in changing the data themselves but in interrupting, delaying or recording for later purposes the data traffic on the bus system.

A transmission of digitally present user data from a transmitter to a receiver is carried out, for example in the form of data blocks or data frames which, apart from the user data, contain further data which, among other things, contribute to discovering and/or correcting disturbances in the transmission. These further data are generated by coders which generate code words for protecting the user data on the basis of input data, supplied to them, within a particular time. The code words are transmitted in the form of code blocks in addition to the user data blocks.

The data frames which are produced from user data blocks and code blocks must not have an arbitrary length as the maximum block or frame length is specified by the various communication standards or bus systems. In addition, user data blocks and code blocks must not be modified in such a manner that such a malicious intervention is not detectable.

German patent specification DE102010042539B4 shows a data transmitter for transmitting blocks of user data which uses an encryption device and an extractor. In this context, only a part of the result of the encryption is appended to the user data before the transmission.

International patent application WO 2013/128317 shows a method and a system for measures against a repeated transmission of recorded messages at a CAN bus by using counts. These counts indicate the number of messages hitherto transmitted.

It is the object of the present invention to provide a method and a system by means of which a high measure of data security is achieved during data transmission, especially in a motor vehicle.

SUMMARY

A method for generating a data frame is disclosed which contains a user data block with the message and a code block. To generate the code block, a first data record is initially coded by means of a first coding algorithm in order to calculate a first code word. Using the first code word thus generated, and the transformed message, a second code word is subsequently calculated by using a second coding algorithm. The data frame comprises the second code word, but not the first code word.

DETAILED DESCRIPTION

The detailed description following refers to the attached drawings which form a part of the disclosure of the invention and in which special exemplary embodiments are shown for illustration by means of which the invention can be implemented practically, for example. Naturally, other exemplary embodiments can be used and structural or other changes can be performed without departing from the scope of the present invention. In particular, the documented order of method steps described is not mandatory, i.e. the order of method steps can be changed in order to achieve the method described or obtain the result of the method, respectively. The detailed description following is not to be understood in a restrictive manner, therefore. Instead, the scope of the present invention is only defined by the attached patent claims.

Embodiments of the invention relate to transmission systems which in the calculation of code words, for example by encryption algorithms, use not only the user data but also calculated code words, for example redundant parity bits.

One protective mechanism against the type of "time attacks" described consists in providing the data to be transmitted with a "time stamp". A data item is then a valid data item for a receiver only when a predefined time interval has not yet elapsed since the sending of the data item. Thus, the data sent by a transmitter via a bus are provided with time information as protection against attacks, which allows the receiver to determine whether the received data are still valid or not. In addition to this protection, methods for fault detection and fault correction can be used.

The transmission of user data present digitally from a transmitter to a receiver is carried out with the aid of data frames which, apart from the user data, contain other data. These other data are generated by coders which generate code words on the basis of the input data supplied to them. The time information described or the measures for fault detection and fault correction, respectively, can now be integrated into the calculation of the code words.

Figure 1:
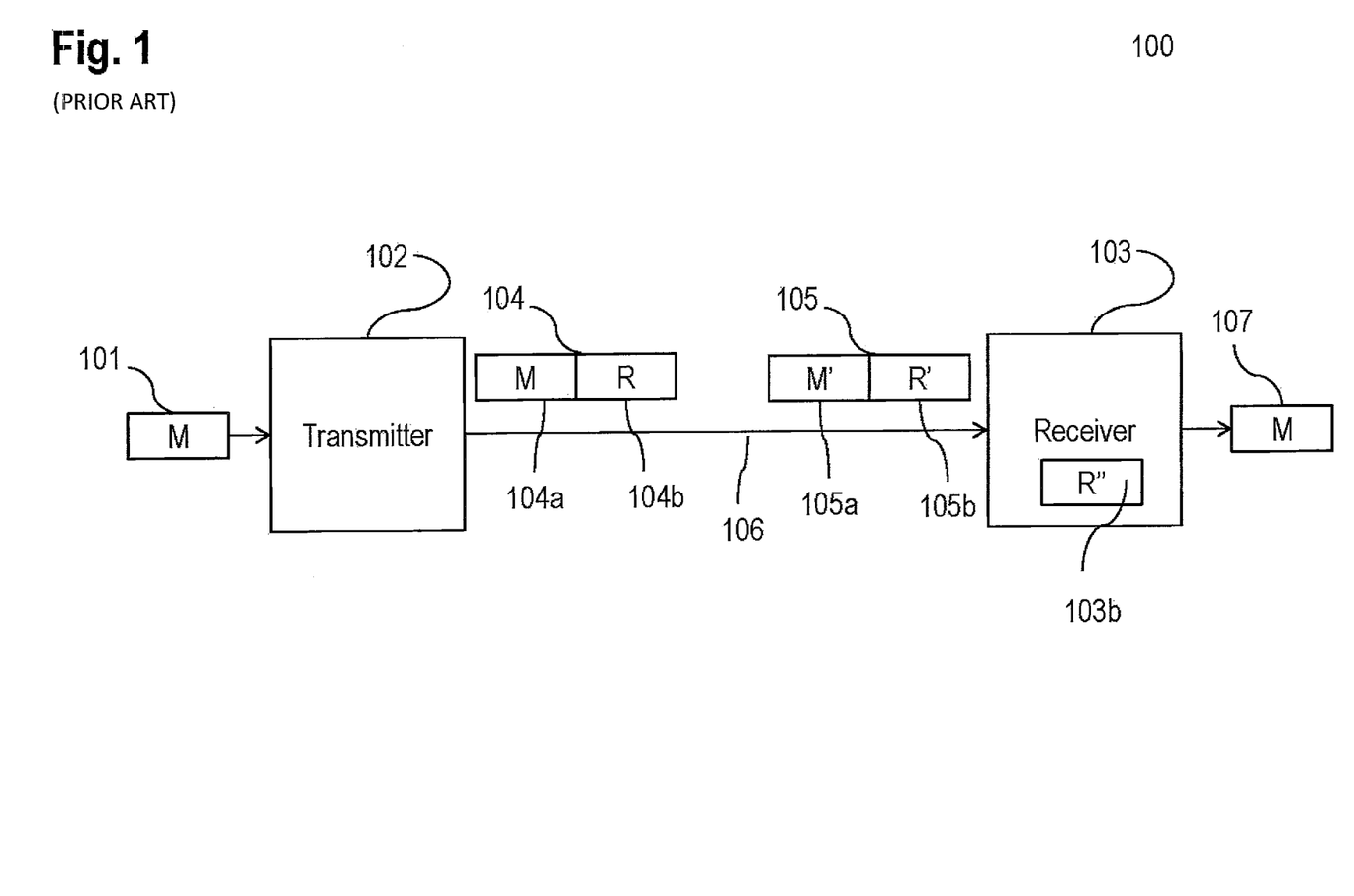
FIG. 1 shows a known system for data transmission which transmits as data frame a user data block and a code block via a bus.

FIG. 1 shows a known transmission system 100 comprising a transmitter 102 and a receiver 103. The transmitter and the receiver are connected to one another via a transmission channel 106. The transmitter 102 transmits a data frame 104 to the receiver 103 via the transmission channel 106.

The transmitter 102 reads a message M and calculates from the message M read a code word R. The message M, which is also called user data or "payload" can be, for example, a sequence of bits which is read by the transmitter 102 in the form of a message data frame 101. The message data frame 101 has, for example, a length which is equal to the number of the sequence of bits. The transmitter generates a user data frame 104*a* and a code block 104*b* which, e.g., are appended to one another and are transmitted via the bus 106 as data frame 104.

The code word R calculated by using the message M is used for the security of transmission and can be a simple parity bit in one embodiment. In this context, for example, the number of ones or zeros of the message M, to be transmitted, is supplemented either by one one or by one zero so that, overall, an even number of ones is transmitted via the bus 106 as data frame 104.

The code word R can also comprise a number of bits and represent information redundant for the message M. An example of a corresponding coding algorithm is a hamming code. The hamming code is a class of block codes of different length. These generated bits in each case supplement different groups of user data bits carrying the information. A further example of such bit sequences are cyclic redundancy codes (CRC) in the case of which the calculation of the code word is based on a polynomial division.

The data frame 104 is transmitted via the transmission channel 106. The transmission channel 106 can be, for example, a bus such as, e.g., a CAN bus, TTCAN bus, Ethernet or a FlexRay bus. However, the transmission channel can also be a physical point-to-point connection between a transmitter and a receiver.

The receiver 103 receives the data frame 105 which contains the received user data block 105*a* and the received code block 105*b*. The received data frame 105 can deviate from the transmitted data frame 104 if the transmitted message M or the code word R, respectively, have been changed. The receiver 103 extracts from the received user data block 105*a* a message M' and initially calculates from it a code word R" 103*b*. The algorithm used for this purpose corresponds to the algorithm used by the transmitter 102 in calculating the code word R. In the case where the calculated code word R" 103*b* is identical to the code word R of the received code block 105*b*, the received user data block 105*a* is transmitted as correct and the message M transmitted with it is interpreted as unchanged. The message M is then forwarded to the frame 107 for further processing.

In the transmission of the data frame 104 via the transmission channel 106, the data contained in the data frame can be changed. One cause for unintended changes can be, for example, disturbances due to increased electromagnetic radiation. Such a change is detected via the calculation of the code word R" and comparison with the received code word R'. However, the change in data can also occur due to intended manipulation. Thus, for example, the user data block 104*a* can be changed in such a manner that the same code word as in the case of unchanged user data would be generated so that the change would not be detected at the receiver 103.

With block codes such as the hamming code, however, it is only possible to check whether errors have occurred in the transmission (integrity). Manipulation of the user data, e.g. in the form that a valid code word R has been calculated, cannot be excluded with known hamming codes.

Figure 2:
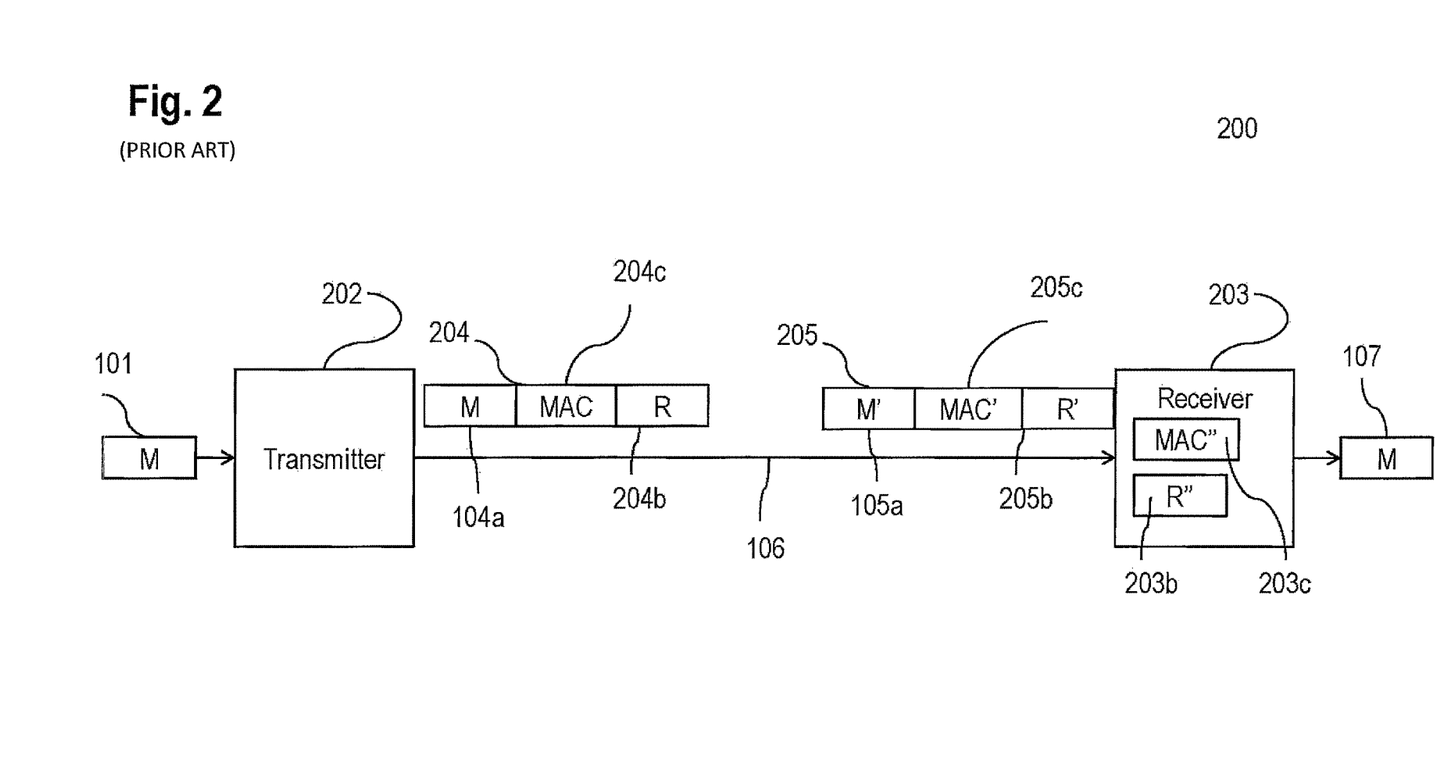
FIG. 2 shows a further known system for data transmission which transmits as data frame a user data block and two code blocks via a bus.

FIG. 2 is a continuation of the transmission system of FIG. 1. In distinction from FIG. 1, the transmitter 202 now generates a data frame 204 which also contains a MAC (Message Authentication Code) block 204*c*. The MAC can be generated by using the message M to be transmitted and with the aid of a key, not shown in FIG. 2. In one embodiment, the MAC is calculated by using user data and a time value or also by only using a time value, the time value being generated in each case, for example, in a transmitter and defining a valid time period for the user data or the message, respectively.

Examples known to the expert for calculating a MAC are, in particular, CMACs (cipher-based MACs) or HMACs (hash function-based MACs). A CMAC is based on a symmetric key code such as, for example, AES (Advanced Encryption Services). Further examples of a MAC are MD5 (Message Digest 5) or SHA1 (Secure Hash Algorithm).

The data frame 204 consists of the user data block 104*a*, the calculated MAC 204*c* and a further block 204*b* for protecting against transmission errors which, for example, contains a cyclic block code. The latter is generated, for example, via a shift register logic and can be a CRC (cyclic redundancy check) code which is calculated via the message M and the generated MAC. The calculated block code R is transmitted as part of the data frame 204. To form the data frame 204, the MAC block (204*c*) is appended to the user data block 104*a*, for example. Subsequently, the second code block 204*b* is appended. The data frame 204 is conveyed to the receiver 203 via the transmission channel 106.

The receiver 203 receives the frame 205 which corresponds to the frame 204 only for the case that no disturbances or changes of the data being transmitted have occurred during the transmission. Using the message M' extracted from the received user data block 105*a* and a corresponding key known to the receiver, a MAC" 203*c* is initially calculated in the receiver and compared with the MAC' extracted from the received MAC block 205*c*. If MAC" 203*c* corresponds to MAC', the authenticity of message M' is considered to be proven, i.e., it is assumed that the message comes from transmitter 202.

Using the received message M' and the calculated MAC" 203c, the second code word R" 203b is subsequently calculated which, for example, represents a cyclic redundancy code. If then R" 203b also corresponds to the received R' extracted from code block 205b, the integrity of the message is also ensured, i.e. that no errors have occurred during the data transmission.

The total length of the data frame 204 to be transmitted thus results from the number of user data bits plus the number of bits for the first and second code block. The data frame 204 to be transmitted can thus obtain a length which goes beyond the maximum permissible length of the corresponding communication protocol. For example, only 154 bits per frame are maximally permissible, for example, in the "extended format" corresponding to CAN Standard 2.0b.

So that this limit is not exceeded, it is proposed in DE102010042539B4 to transmit only a part of the encryption result, that is to say only a part of the first code word, to the receiver. One disadvantage of this procedure is that this does not unequivocally ensure the integrity and the authenticity of the received message.

If the MAC is not calculated via the message M but only by using a time value Ts, the advantage is that the MAC calculating unit can calculate a list of MACs in the device on the transmitter and receiver side. The MAC calculating unit can thus be utilized efficiently and, in particular, the MAC calculation is no longer in the real-time path between valid user data and beginning of transmitting (at the transmitter) or, respectively, received user data and concluded checking (at the receiver). This precalculation would also be possible if the MAC calculation was not based on the time value Ts but on another known sequence of numbers, e.g. a counter value for the transmitted user data blocks.

Figure 3:
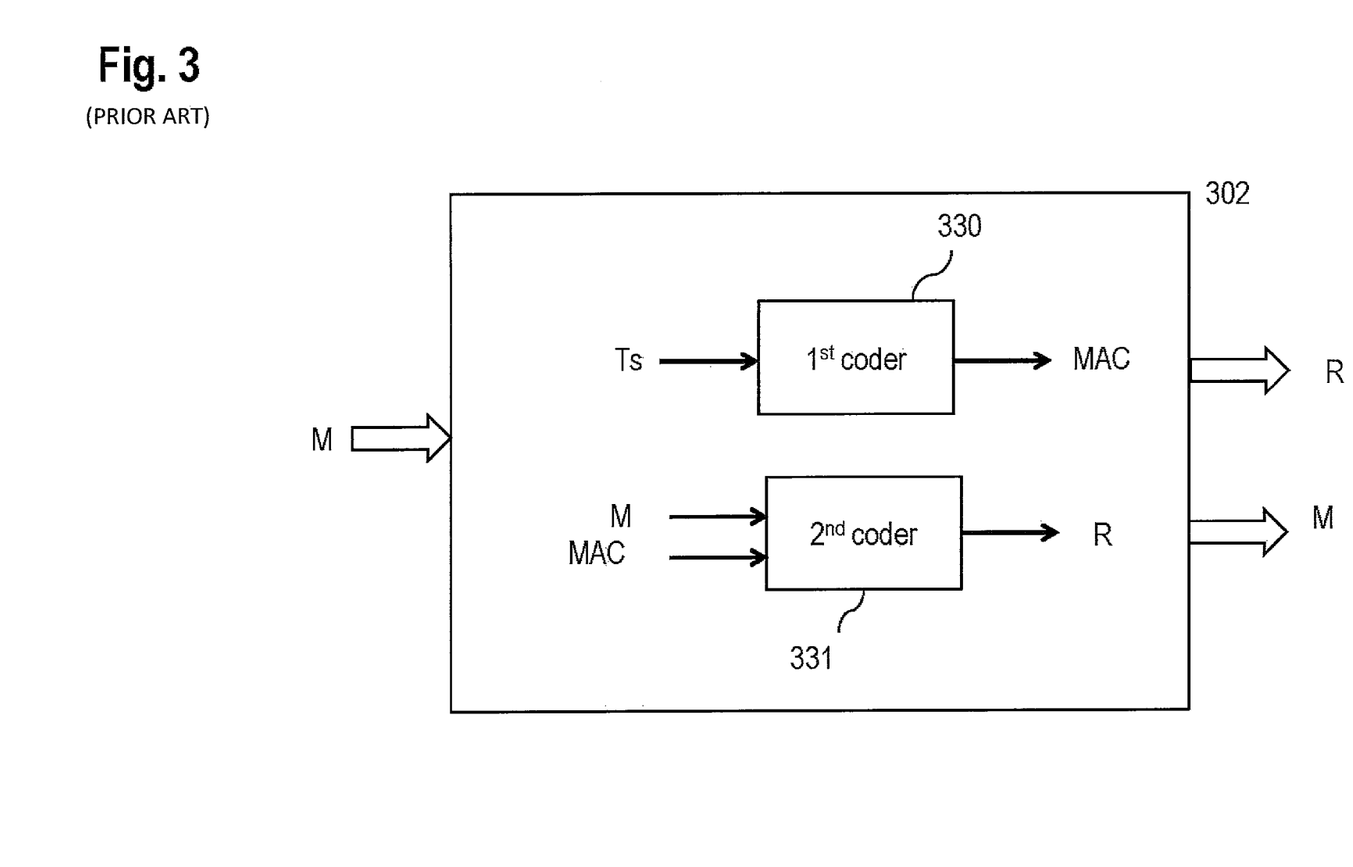
FIG. 3 shows a known transmitter for calculating code words.

FIG. 3 shows a transmitter 302 with a first coder 330 and a second coder 331. The first coder 330 codes a time value Ts by using a first coding algorithm. This first coding algorithm is, for example, an algorithm for generating a CMAC, AES or an algorithm for generating an MD5 code. The first code word MAC generated by the first coding algorithm and the message M are subsequently read by the second coder 331 which, by using a second coding algorithm, for example an algorithm for calculating a hamming code or a CRC (Cyclic Redundancy Code) code, calculates a second code word R.

The transmitter 302 internally generates a time value (Ts) at the transmitting end which is unambiguously linked logically to the message M. The time value 220 (Ts) at the transmitting end can be generated, for example, in the transmitter 302 in that the time of an internal timer, not shown, e.g. a clock, is read in particular intervals. In accordance with the time intervals selected, the time value Ts thus describes a time period which defines the validity of the message with its allocation to the message.

Figure 4:
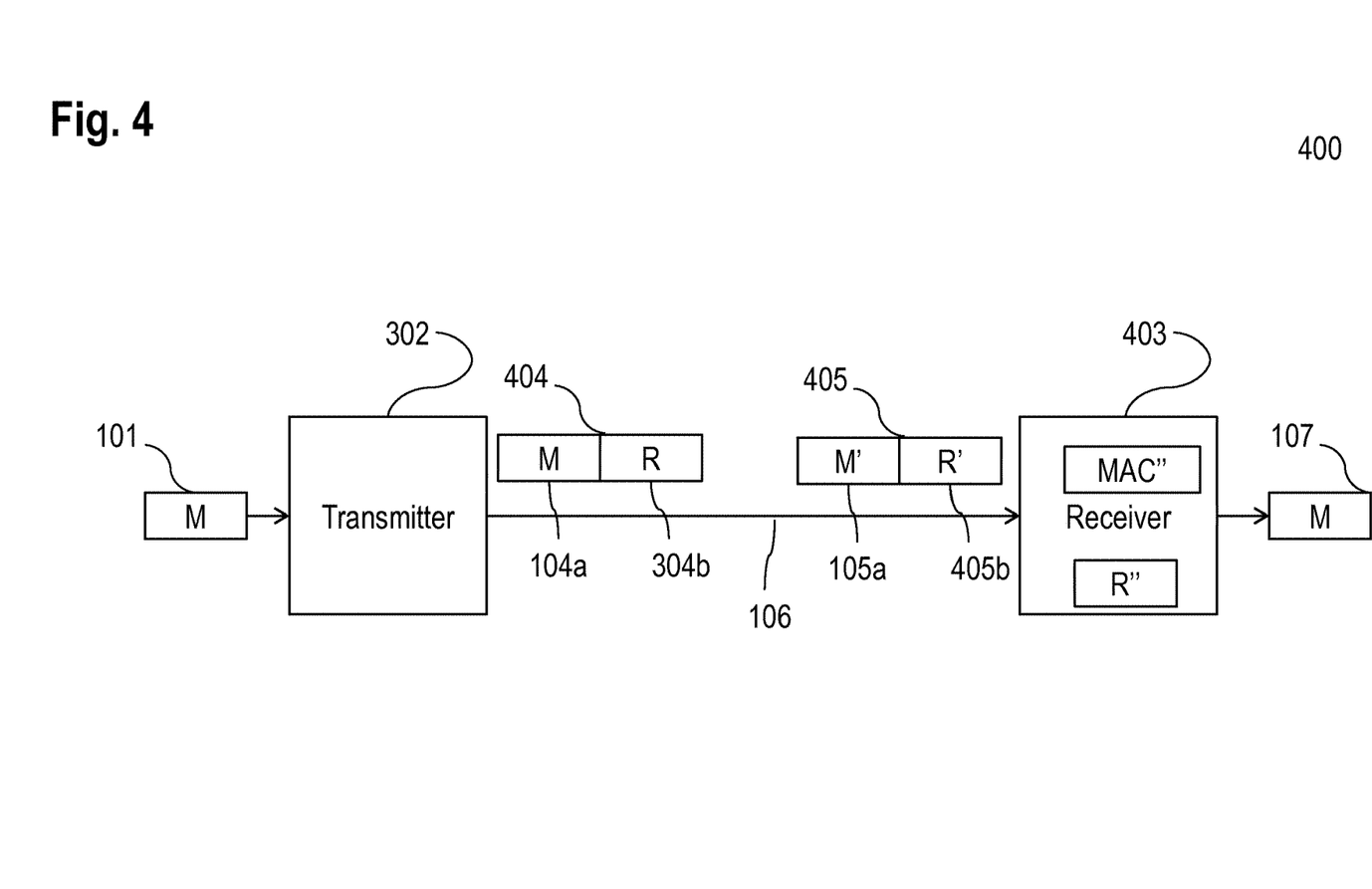
FIG. 4 shows an exemplary embodiment of a transmission system in which a short data frame is transmitted.

FIG. 4 shows as an exemplary embodiment a transmission system 400 which consists of a transmitter 302, a data bus 106 and a receiver 403. The transmitter 302 generates a shortened data frame 404 which is transmitted to the receiver 403 via the bus 106. The data frame 404 consists of a user data block 104a and a code block 304b, the code word R of the code block 304 being formed in accordance with the transmitter 302 shown in FIG. 3. The data frame generated by the transmitter 302 thus contains, apart from the message M or the user data in block 104a, respectively, an implicit time information on the validity of the user data which are contained in coded form in the second block 304b.

The receiver 403 initially extracts from the received data frame 405 the message M' and initially calculates from it the first code word MAC", using the corresponding key. The algorithm used for this purpose corresponds to the one used in the transmitter, for example an algorithm for generating a CMAC. For the case that the first code word was calculated in the transmitter by using a data record which contains a time value Ts at the transmitting end, the receiver generates a time value Tr at the receiving end which is utilized for calculating the MAC'.

From the calculated MAC' and the message M', the second code word R" can then be calculated. The algorithm used for this purpose corresponds to the one used in the transmitter and is, for example, an algorithm for generating a cyclic redundancy code (CRC). The code word R" thus obtained is compared with the code word R' extracted from the received code block 405b. If R' and R" match, the correctness of the calculated MAC" is also ensured implicitly.

The method described proves both the authenticity and the integrity of the received message M', having transmitted a relatively short data frame 404. In an example, not shown, of this embodiment, the data frame 404, in turn, can be part of a higher-level data frame to be transmitted, not shown, which comprises the data frame 404. Thus, for example, a lower protocol layer could add further data to the data frame 404 and thus generate a higher-level data frame of greater length.

If a second coding algorithm is used for connecting message M and MAC in the second coder 331 but the MAC itself does not depend on the message M, it is possible to modify the message and subsequently adapt the code word R, e.g. the CRC, correspondingly without knowing the MAC.

In order to close this safety gap, the message M is transformed before the CRC calculation. This transformation of the message M into a transformed message TM is performed by evaluating the MAC which, of course, is not known to a potential attacker. At best, an attacker could attempt to guess the MAC. The following should apply for the transformation of the message M:

The characteristic of a CRC that individual bit errors can be detected reliably by the receiver must be retained. The receiver uses only the received data block 405 and the locally calculated MAC" for the CRC calculation.

The transformation of the message M can contain one or more "bit-linear" transformation steps since "bit-linear" transformations, e.g. XOR (Exclusive OR) preserve the aforementioned CRC characteristic.

The transformed message TM must always change if a single bit of message M changes. This means that all bits of the original message M must be represented in the transformed message TM.

The transformation can add bits if this simplifies the calculation.

The transformation algorithm must be simple to implement in software and hardware.

One transformation of the message M which has the said characteristics is, for example, an arbitrary re-sorting of the bits of the message M. A special form of re-sorting is displacing bits by a particular number of positions. In this context, the displacing of the bits can be implemented both to the left and to the right referring to the message as a stored message data word. To the left means that a particular number of MSB (most significant bits) are shifted out of the message data word. In the case of a circular displacement, the bits shifted out at one end of the message data word are inserted again as LSB (least significant bits) at the other end of the message data word. A circular displacement is also called rotating or rotation, respectively. If a processor does not support rotation in one exemplary embodiment, it is also possible to reproduce this by means of shifting operations and bit operations.

A further example of a transformation of the message M utilizes an extended message data word. In this type of transformation, it is not only the length of the message M, e.g. 32 bits, which is used for re-sorting the bits. For example, an extended message data word can have twice as many bit positions, e.g. 64 bits, in comparison with the message. In this case, e.g., displacing to the left can take place within the extended message data word so that the MSB of the message M are shifted to the left and a known sequence of data bits is inserted into the message data word on the side of the LSB (least significant bits).

So that the re-sorting of the bits cannot be reproduced easily by an attacker, the rule for re-sorting is determined by the MAC generated. For a message M having a length of 32 bits, there are $32! = 2.6 \times 10^{35}$ possibilities of re-sorting the bits of the message M.

Figure 5:
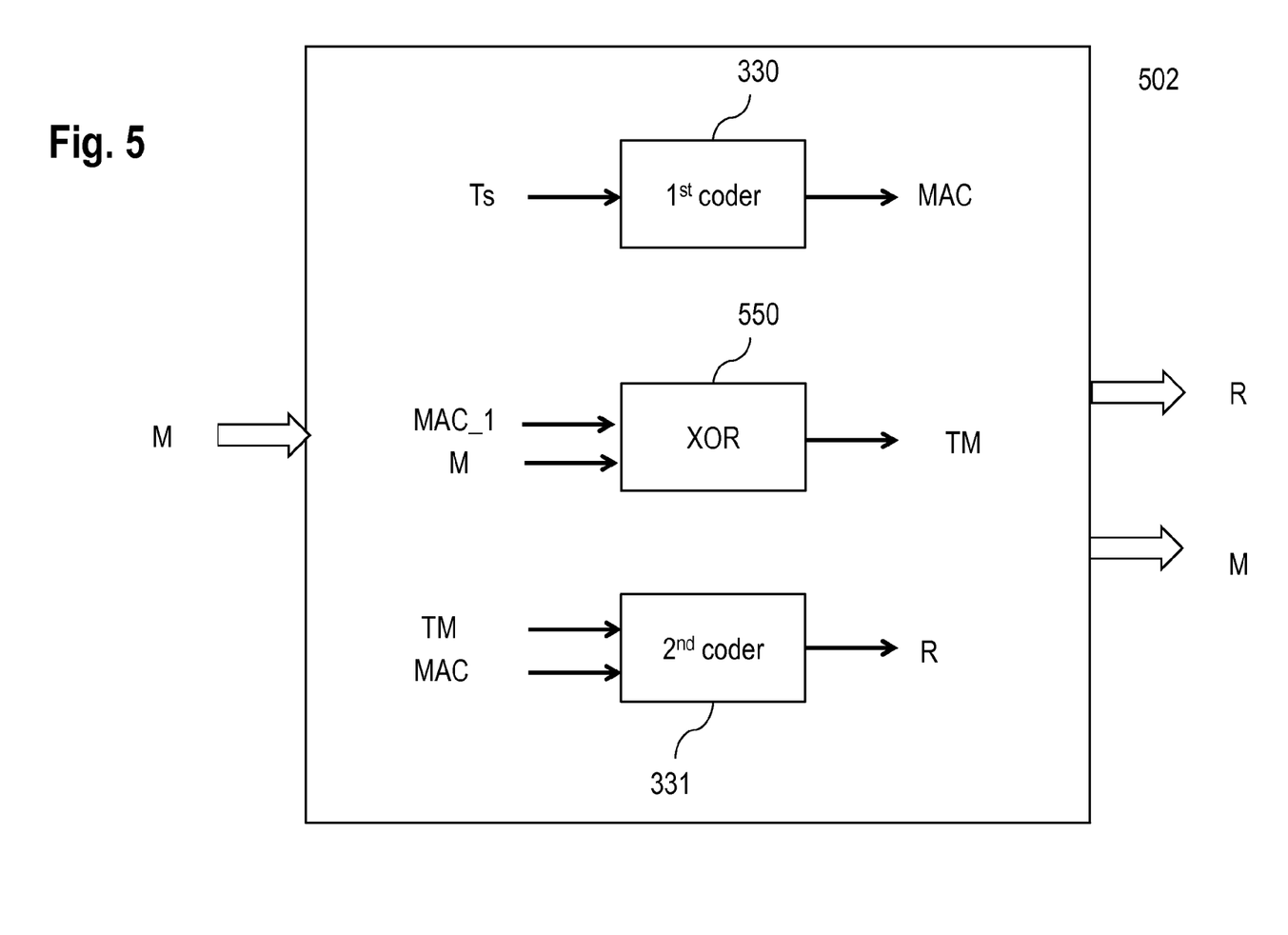
FIG. 5 shows an exemplary embodiment of a transmitter which provides a user data block and a code block, the message being transformed.

FIG. 5 shows a transmitter 502 which comprises a first coder 330, a transformation element 550 and a second coder 331. The first coder 330 uses, for example, the time value Ts generated in the transmitter 502 and a key, not shown, for calculating the MAC with a first coding algorithm. The transformation element 550 transforms the message M into a transformed message TM and is, for example, an XOR (Exclusive OR) which links the message M to a first part of the generated MAC (MAC_1). The first part of the generated MAC (MAC_1) consists, for example, of the first 32 bits of the generated MAC. The second coder 331 calculates the code word R from the generated MAC and the transformed message TM with the aid of a second coding algorithm.

Figure 6:
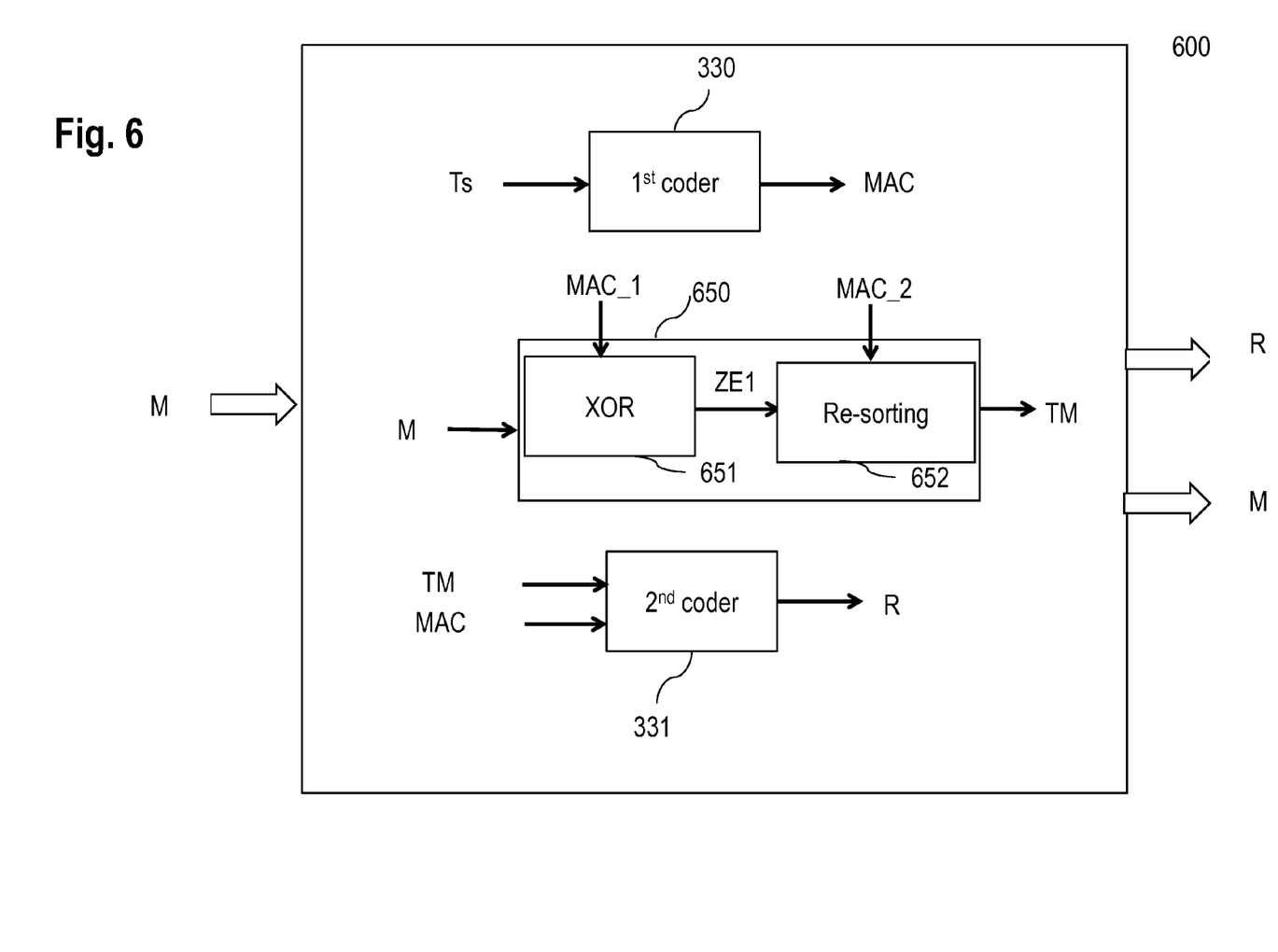
FIG. 6 shows a further exemplary embodiment of a transmitter which provides a user data block and a code block, the message being transformed.

FIG. 6 shows a transmitter 600 with a first coder 330, a transformation element 650 and a second coder 331. The first coder reads the time value Ts generated in the transmitter 600 and calculates from it a MAC with the aid of a key. The transformation element 650 transforms the message M into a transformed message TM. The transformation element 650 contains a combinatory element 651, for example an XOR which links the message M to a first part of the MAC (MAC_1) and generates a first intermediate result ZE1. In an example of this embodiment, the message M has a length of 32 bits. Correspondingly, the first part of the MAC (MAC_1) is 32 bits long. Furthermore, the transformation element 650 contains a re-sorting module 652 which performs re-sorting of the bits of the intermediate result ZE1.

The order of operations shown in FIG. 6, i.e. initially performing the function of the combinatorial element 651 and subsequently performing the function of the re-sorting module 652 should not be understood to be restrictive. Thus, in a further example of this embodiment, re-sorting first acts on the message M. The result is then supplied to the combinatorial element 651.

In one example of this embodiment, the message M is shown as a bit sequence having a length of 32 bits. Shifting to the left by 5 positions leads to the 5 MSB (most significant bits) being shifted out of a message data word, not shown, and all other bits are shifted to the left by 5 positions. The 5 MSB shifted out of the message data word are correspondingly inserted at the position of the 5 LSB (least significant bits). This is a rotation or circular displacement. The other possibility consists in initializing an e.g. 64-bit-wide shift register with the message M and a further 32 known bits. If the message M is aligned with the shift register on the LSB side, it is necessary to shift to the left. In this shifting, 5 MSB of the initialization bits are lost but no bits of the message M. On the LSB side, 5 bits are correspondingly added.

A second part of the MAC generated (MAC_2) determines the number of bits by which the intermediate result ZE1 is to be displaced. In one example of this embodiment, MAC_2 is 4 bits long and defines a displacing of the intermediate result ZE1 by, for example, 12 bits. The transformed message TM and the MAC calculated from the time value Ts are subsequently processed by the second coder 331 with the aid of the second coding algorithm to form a code word R. The second coding algorithm is, for example, a CRC.

Further possibilities for re-sorting operations simple to implement in software are the exchanging of bytes or special bit operations. To exchange bytes, processors offer operations, e.g. for recalculating Little Endian into Big Endian or conversely, respectively. For special bit operations, the BSPLIT/BMERGE instructions of the TriCore Architecture by Infineon can serve as an example. In the BSPLIT instruction, a 32-bit word is converted into two 16-bit data words. The one 16-bit word contains all odd bits of the 32 bit word and the other one contains the even ones. The inverted operation is BMERGE.

In particular, it is also possible to carry out these operations step by step after one another, the operations being controlled by the MAC value. In a further example, the 32 bits of data are controlled by 5 MAC bits in a first step— shifted circularly by N bits. This is followed by a BSPLIT and it is controlled by a further MAC bit, in which order the even and the odd bits are arranged in a 32-bit word as intermediate result. This 32-bit word, in turn, can be shifted circularly controlled by a further 5 MAC bits. The number of possible re-sorting results can be increased greatly by the re-sorting in a number of steps. In the case of circular shifting of 32 bits of data, there are only 32 possibilities; the BSPLIT intermediate step and further shifting results in 2048 possibilities in the preceding example.

In this example of incremental re-sorting, attention was paid to the fact that no operation will cancel the re-sorting of a preceding operation again. If, for example, shifting occurs in two steps without the intermediate step of BSPLIT, there will also still be only 32 possibilities of how the bits are arranged after both operations. This requirement must be applicable to all possible results of an operation. In the example described, it is therefore not controlled whether there will be a BSPLIT but rather how the data are assembled again into 32 bits after the BSPLIT. If the re-sorting is performed by hardware, even much more powerful re-sorting algorithms can be implemented.

Figure 7:
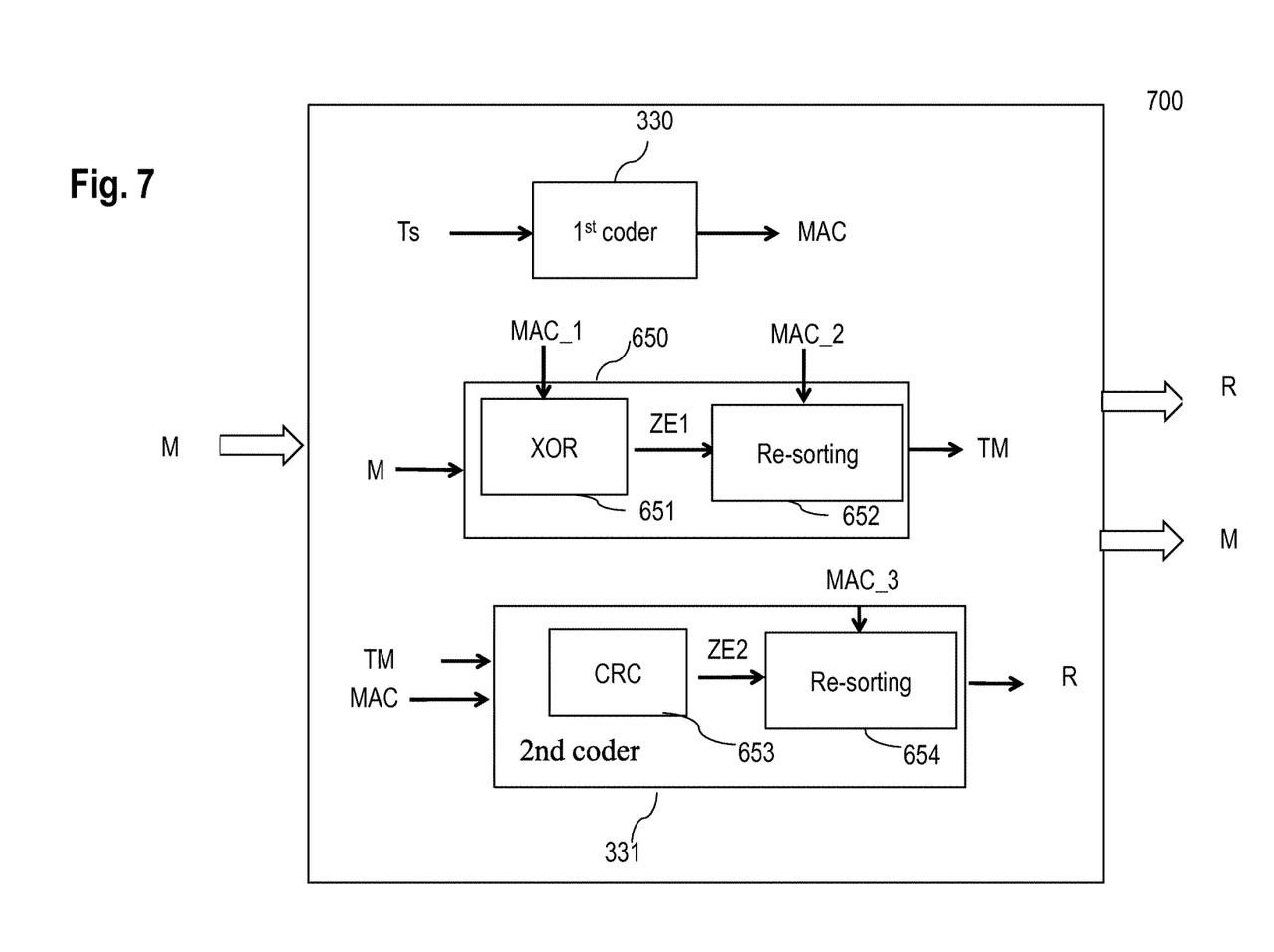
FIG. 7 shows an exemplary embodiment of a transmitter which provides a user data block and a code block, the message being transformed and the second coder containing a CRC block and a re-sorting module.

FIG. 7 shows a transmitter 700 which, compared with the transmitter 600 of FIG. 6, contains in the second coder 331 a CRC module 653 and a further re-sorting module 654 which, for example, implements a displacement. The second coder 331 reads the transformed message TM and the generated MAC and initially calculates a second intermediate result ZE2 with the aid of the CRC. The second intermediate result ZE2 is then supplied to the re-sorting module 654. The re-sorting module 654 displaces, for example, the second intermediate result ZE2 by a certain number of bits which is determined by a third part of the MAC (MAC_3). In one example of this embodiment, MAC_3 is 4 bits long and defines a displacement of the second intermediate result ZE2 by 15 bits. The result of the second coder 331 is the second code word R.

Figure 8:
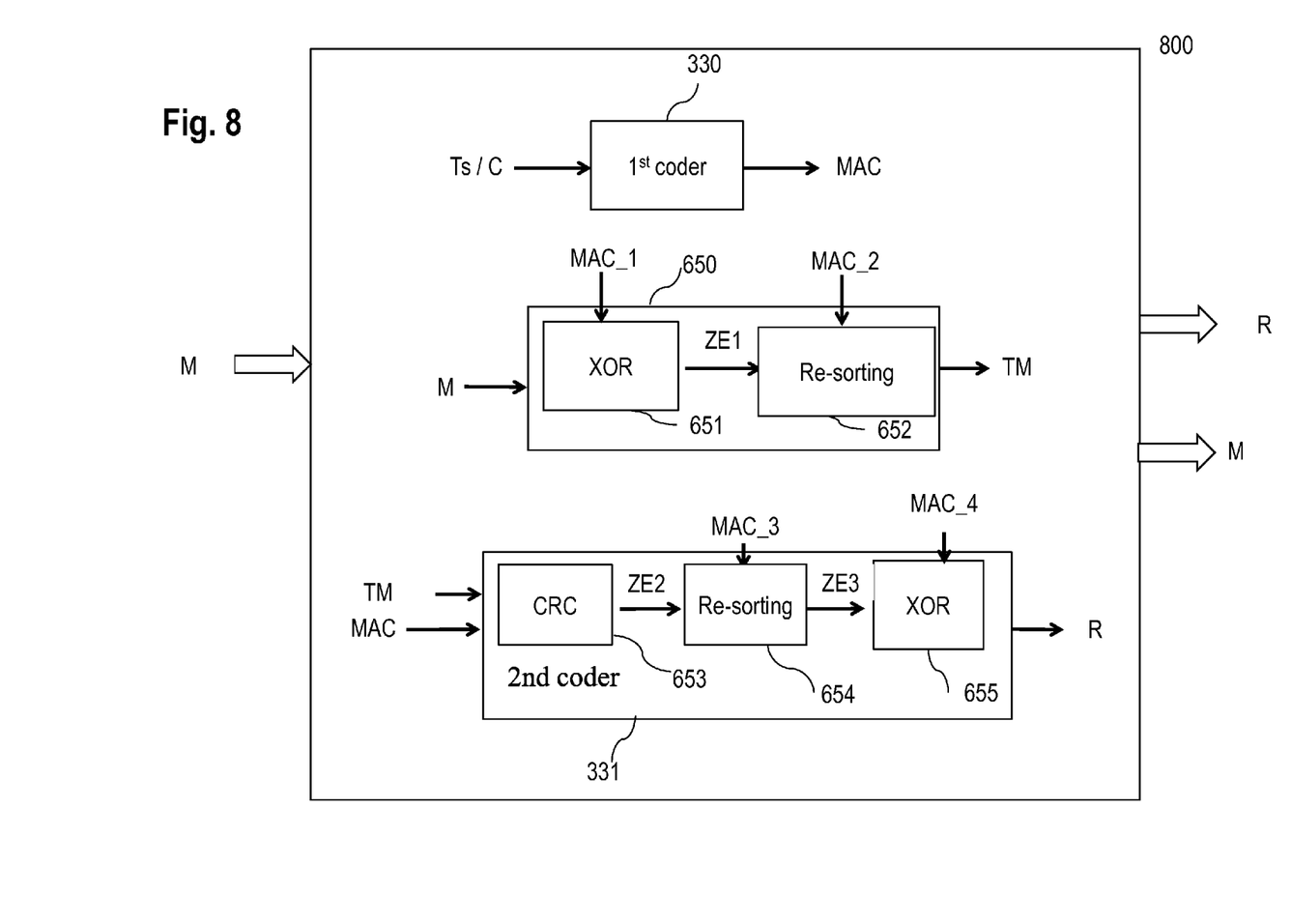
FIG. 8 shows an exemplary embodiment of a transmitter, the second coder containing a CRC block, a re-sorting module and an XOR block.

FIG. 8 shows a transmitter 800 which, compared with the transmitter 700 of FIG. 7, has an extended second coder 331. The second coder 331 comprises, apart from the CRC module 653 and the re-sorting module 654, a further combinatorial element 655 which can be, for example, an XOR (Exclusive OR). The second coder 331 reads the transformed message TM and the MAC generated and initially calculates a second intermediate result ZE2 with the aid of the CRC module 653. The second intermediate result ZE2 is then displaced, for example, by a certain number of bits. The number of bits to be displaced is determined via the third part of the MAC (MAC_3). The result of the re-sorting module 654 is an intermediate result ZE3 which is connected to a fourth part of the MAC generated (MAC_4) by the XOR element 655.

The order of operations shown in FIG. 8, e.g. initially performing the transformation with the transformation element 650 by the function of the combinatorial element 651 and subsequent performing of the function of the re-sorting module 652 should not be understood to be restrictive. In the same manner, the order of functions in the second coder 331 is also a variable. Thus, for example, firstly a re-sorting could be performed by a re-sorting module 654 and a subsequent CRC calculation by a CRC block 653.

Instead of the time value Ts shown in FIG. 8, a counter value C can also be used. The receiver 403 has a device, for example a counter, which can generate exactly the same counter value C which was used for calculating the MAC in the transmitter 800. The starting value of the counter which is used for calculating the MAC in the transmitter 800 can be known to the receiver, for example. The starting value can also be generated in the transmitter 800 in one example of this embodiment and communicated to the receiver by a corresponding message at the beginning of a series of data frames to be transmitted.

In order to resume the link without resetting the overall system after relatively large transmission faults such as, e.g., after data frames lost completely, the counter value C is synchronized between transmitter and receiver. For simple transmitters without return channel, for example, the counter value can be transmitted not only at the beginning but in particular intervals. If there is a return channel, the receiver can request the count again explicitly.

Figure 9:
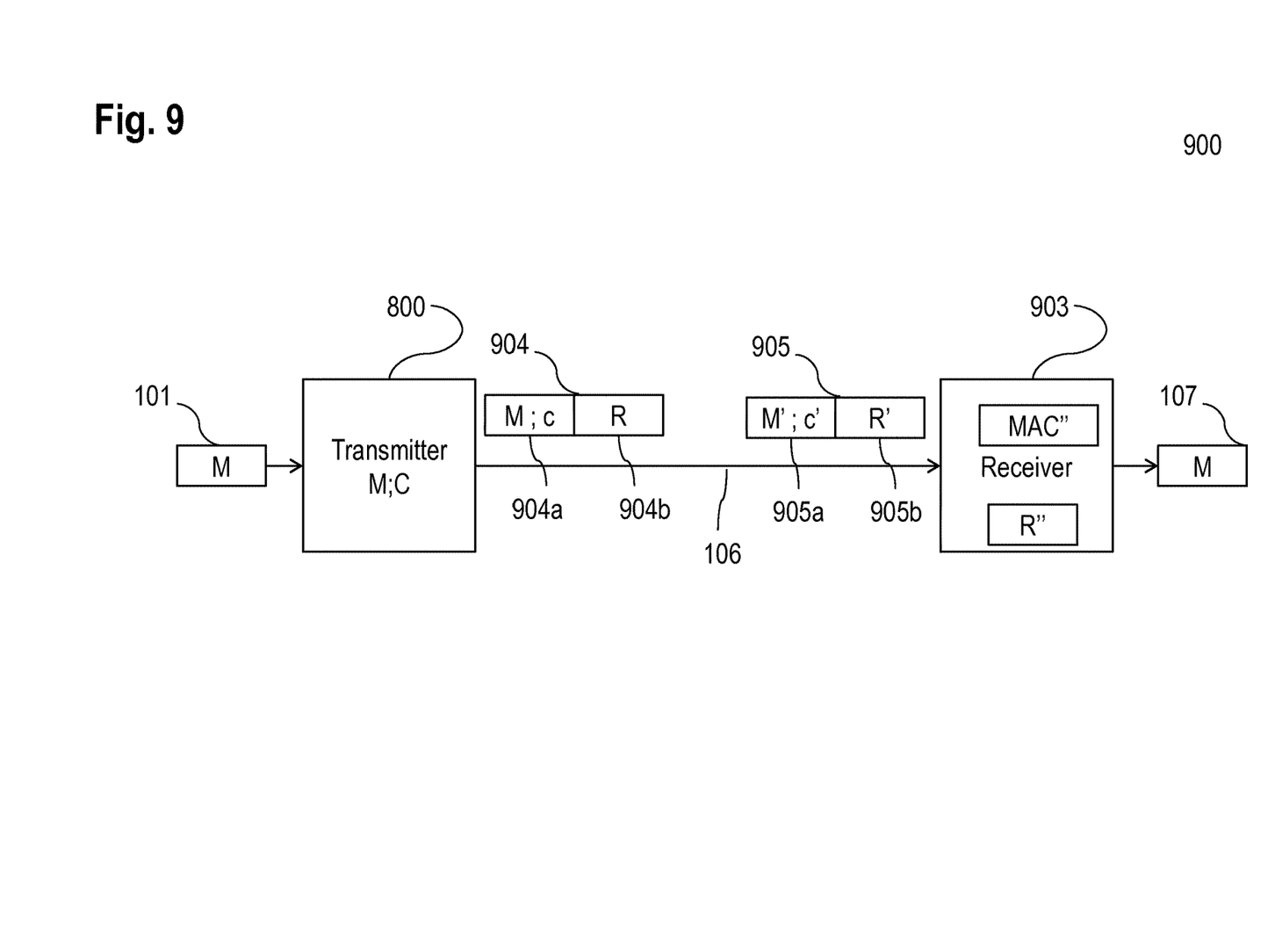
FIG. 9 shows an exemplary embodiment of a transmission system in which a short data frame is transmitted, which contains a part of a count.

FIG. 9 shows a transmission system 900 which has the transmitter 800, a transmission channel 106 and a receiver 903. The data frame 904 to be transmitted consists only of the user data frame 904a and the second code block 904b and thus has a shorter length compared with the known data frames. The advantage of transmitting a part of the counter value used lies in the fact that when a data frame is lost, e.g. due to massive disturbances in the transmission, the receiver 903 is capable of synchronizing itself again with the transmitter 800. If, for example, during the reception of two successive data frames, two parts of the counter value are extracted which differ by more than one, e.g. c1=0101 and c2=0111, a data frame is lost if the counter value C generated in the transmitter 800 increments by one per data frame. The more bits of the counter value are included in the user data block the greater this noise immunity will become.

Mixed forms with time and counter value are also possible, i.e. the time value is constant within a particular time interval but an additional counter value is used to distinguish between different data frames within this time interval.

It may also be appropriate to transmit parts of the time value if the clocks in the transmitter and receiver are not precisely synchronized and/or it cannot be excluded that the transmitter only sends a data frame so late that it no longer arrives at the receiver in the time interval having the same time value. For this simple case, it is sufficient if the least significant time value bit is transmitted so that the receiver can distinguish whether the data frame was sent in the current time interval or in the preceding one.

Using the corresponding key, the receiver 903 first calculates the first code word MAC" with the aid of the message M' extracted from the received data frame 905 and the self-generated counter value C. From the calculated MAC", the counter value C and the message M', the second code word R' can then be calculated. The algorithm used for this purpose corresponds to the one used in the transmitter 800. The code word R" thus obtained is compared with the code word R' extracted from the received code block 905b. If R' and R" match, the correctness of the calculated MAC' is also ensured implicitly. With the method described, both the authenticity and the integrity of the received message M' is proven, a relatively short data frame 904 having been transmitted.

Using an unambiguous counter value C in calculating MAC has the advantage that a malicious attacker does not simply monitor the traffic on the transmission channel or on the bus 106 and manipulate it subsequently in such a manner that an intercepted data frame is output time and again on the bus. By using a counter value C changing from data frame to data frame, two successive data frames are always different.

Figure 10:
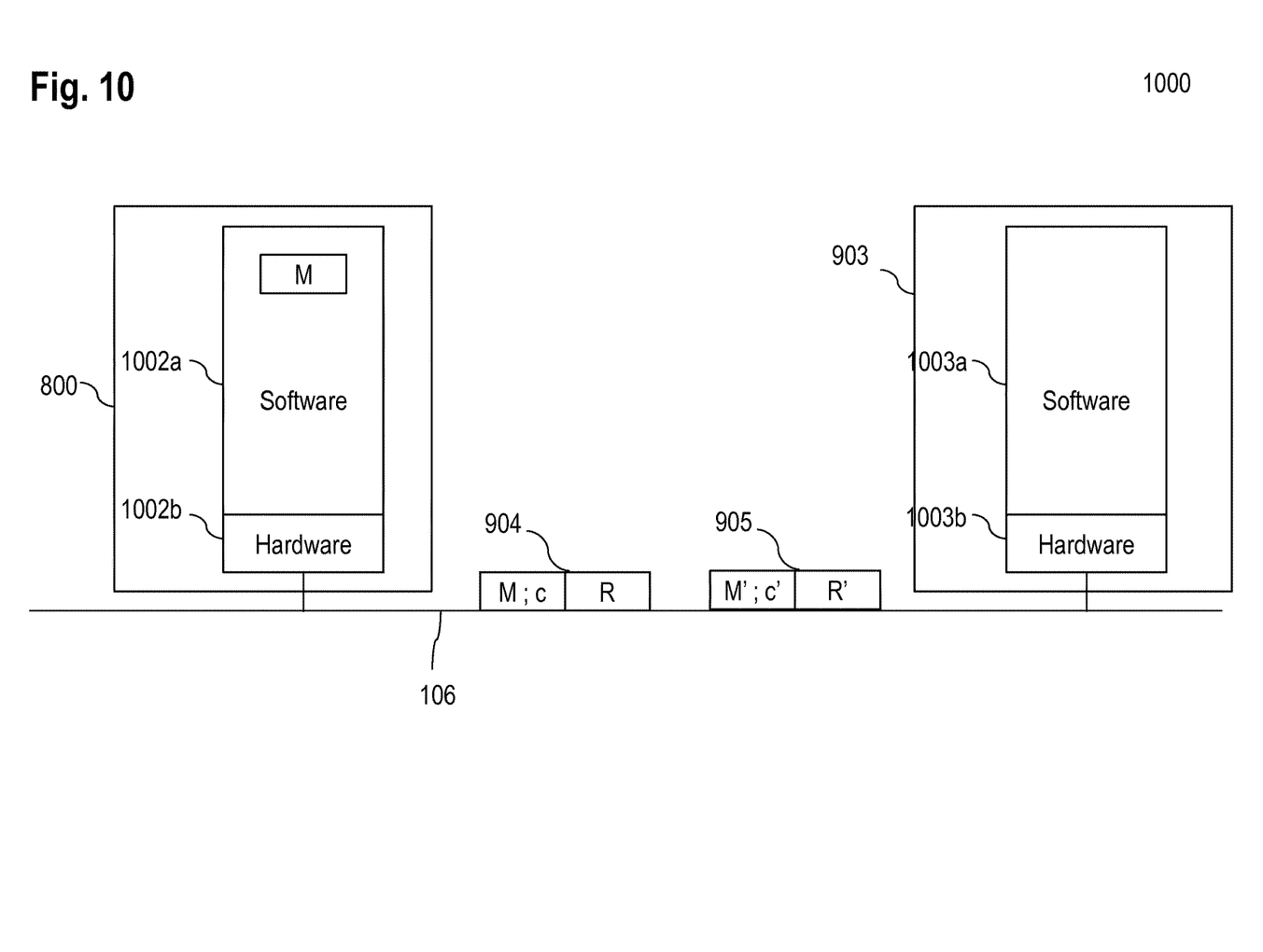
FIG. 10 shows a bus system for data transmission in which short data frames are transmitted.

FIG. 10 shows a bus system 1000 as an example of a possible implementation of the system for data transmission. The bus system consists of a transmitter 800 which generates a data frame 904, a bus 106 for transmitting the data frame 904, and a receiver 903.

The transmitter 800 consists of a first unit 1002a and a hardware interface 1002b. The first unit 1002a can be, for example, a computing unit (CPU) on which a program is running. The unit 1002a calculates, for example, the first code word MAC and the second code word R. The unit 1002a and/or the hardware interface 1002b generates from the message M and the code words MAC and R and possibly the counter value C a data frame 904. The hardware interface 1002b is connected to a bus 106.

In an exemplary embodiment, not shown, a DMA controller (Direct Memory Access Controller) is used which is connected to the bus and can transfer data independently of a CPU (Central Processing Unit) via the bus. If the coding algorithms operate block-based, the use of a DMA controller provides for a particularly efficient implementation.

The bus 106 is, for example, a CAN bus. The transmitter 800 transmits a data frame 904 via the bus 106 to a receiver 903.

The receiver 903 can also consist of two units 1003a and 1003b. The unit 1003a is, for example, a computing unit (CPU) and the unit 1003b is, for example, a hardware interface. The receiver reads the received data block 905 and calculates from it the message M again. If a CRC is used for generating the code block 904b, a measure of the dissimilarity of two generated data frames can be determined mathematically via the hamming distance. This meets the typical security requirements in the data transmission, e.g. in the transmission via a CAN bus in the motor vehicle.

Figure 11:
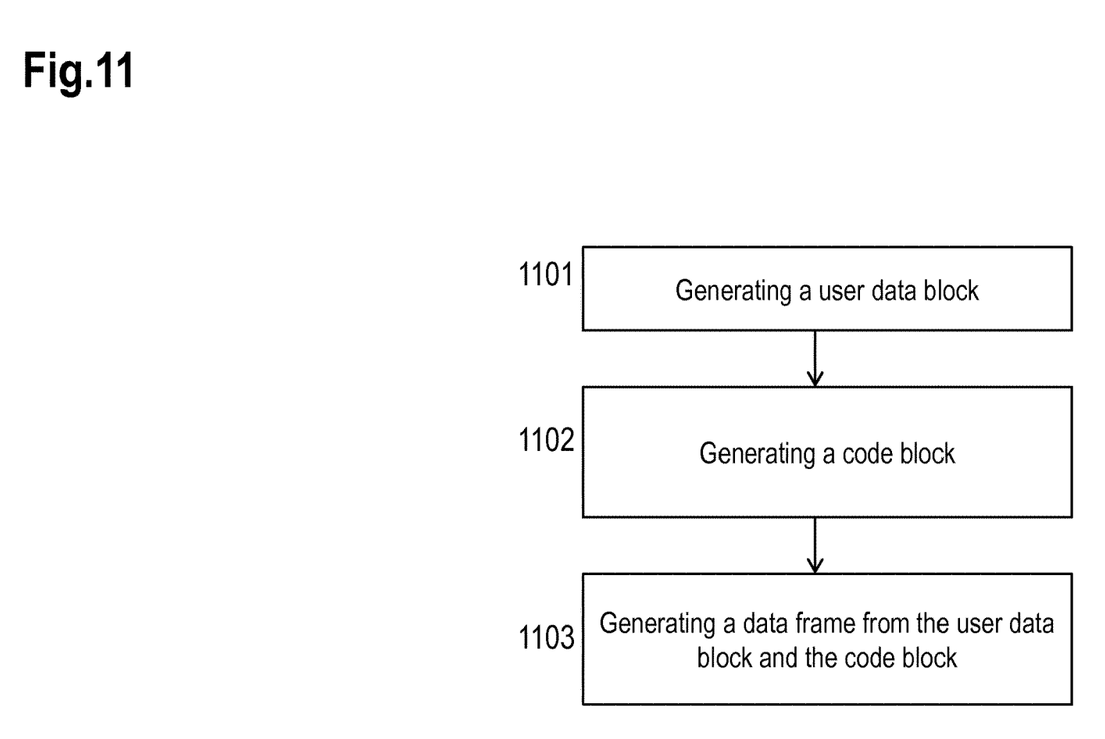
FIG. 11 shows an exemplary embodiment of a method for protected data transmission.

FIG. 11 shows the essential steps of the method described for generating a relatively short data frame. After a user data block is generated in the first step 1101, a code block is generated in the subsequent step 1102 before a data frame is generated from the user data block and the code block in step 1103.

The method presented can be implemented on a microprocessor. The program code running on the processor core (CPU) can be examined by debuggers or analyzing tools connected to the microprocessor. The method described for generating data frames minimizes the required transmission bandwidth particularly in the case of networks in the automobile. It provides for a variable data frame length in dependence on the necessary security. This makes it possible to implement both applications in a small network, e.g. in the area of an on-board network, and in a relatively large network such as is used, for example, in vehicle-to-vehicle communication.

What is claimed is:

1. A method for generating a data frame which contains a user data block and a code block, comprising:
    generating the user data block using a processor, the user data block comprising a message,
    calculating a first code word by coding a first data record by means of a first coding algorithm using the processor,
    transforming the message into a transformed message by using the first code word using the processor,
    calculating a second code word using the first code word, the transformed message, and a second coding algorithm using the processor,
    wherein the data frame comprises the second code word as the code block, but not the first code word, and
    wherein the second code word is effective to verify both transmission integrity and ascertain whether data manipulation has occurred without requiring two code words in the data frame.

2. The method as claimed in claim 1, the first data record comprising the message.

3. The method as claimed in claim 1, the first data record comprising a counter value or a time value.

4. The method as claimed in claim 1, wherein the generating of the transformed message is implemented by a combinatorial linkage of the message with a first part of the first code word.

5. The method as claimed in claim 1, wherein the generating of the transformed message comprises:
    calculating a first intermediate result by a combinatorial linkage of the message with a first part of the first code word, and
        re-sorting bits of the first intermediate result, wherein the re-sorting is determined by a second part of the first code word and a result corresponding to the transformed message.

6. The method as claimed in claim 5, wherein the re-sorting is carried out by a rotation.

7. The method as claimed in claim 4, wherein the combinatorial linkage comprises an XOR linkage.

8. The method as claimed in claim 1, wherein the second coding algorithm contains a CRC calculation.

9. The method as claimed in claim 8, wherein the calculated CRC is re-sorted for calculating the second code word, wherein the re-sorting is determined by a third part of the first code word.

10. The method as claimed in claim 1, wherein the calculation of the second code word comprises:
    calculating a second intermediate result by generating a CRC code based on the transformed message and the first code word,
    re-sorting the calculated CRC to generate a third intermediate result, and
    combinatorially linking the third intermediate result with a fourth part of the first code word.

11. The method as claimed in claim 1, wherein the first code word comprises a CMAC code, an AES code, or a MD5 code.

12. A method for generating a higher-level data frame which comprises at least one data frame which contains a user data block and a code block, comprising:
    generating the user data block using a processor, the user data block comprising a message,
    calculating a first code word by coding a first data record by means of a first coding algorithm using the processor,
    transforming the message into a transformed message by using the first code word using the processor,
    calculating a second code word using the first code word, the transformed message, and a second coding algorithm using the processor,
    wherein the data frame comprises the second code word as the code block, but not the first code word, and
    wherein the second code word is effective to verify both transmission integrity and ascertain whether data manipulation has occurred without requiring two code words in the data frame.

13. A transmitter which is configured to generate a data frame which contains a user data frame and precisely one code block, comprising:
    means for generating the user data block, the user data block comprising a message,
    means for generating the code block comprising
        first coding means for generating a first code word which is configured to use a first data record,
        a transformation element configured to transform the message, and
        second coding means for generating a second code word which is configured to use the first code word and the transformed message,
    wherein the code block comprises the second code word, but not the first code word, and
    wherein the second code word is effective to verify both transmission integrity and ascertain whether data manipulation has occurred without requiring two code words in the data frame.

14. The transmitter as claimed in claim 13, the first data record comprising the message and/or a counter or time value.

15. The transmitter as claimed in claim 14, the user data block containing the counter or time value or a part of the counter or time value.

16. A microprocessor which is configured to access a memory in which is stored executable instructions, and upon executing the executable instructions is configured to perform a method for generating a data frame which contains a user data block and a code block, comprising:
    generating the user data block, the user data block comprising a message,
    calculating a first code word by coding a first data record by means of a first coding algorithm,
    transforming the message into a transformed message by using the first code word,
    calculating a second code word using the first code word, the transformed message, and a second coding algorithm,
        wherein the data frame comprises the second code word as the code block, but not the first code word, and wherein the second code word is effective to verify both transmission integrity and ascertain whether data manipulation has occurred without requiring two code words in the data frame.

\* \* \* \* \*